United States Patent [19]

Smith

[11] Patent Number: 4,752,495

[45] Date of Patent: Jun. 21, 1988

[54] PRODUCT FOR AND METHOD OF ENHANCING THE FLAVOR OF FOOD

[76] Inventor: Mary A. Smith, 3526 Zumstein Ave., Cincinnati, Ohio 45208

[21] Appl. No.: 18,040

[22] Filed: Feb. 24, 1987

[51] Int. Cl.$^4$ .............................................. A23L 1/221
[52] U.S. Cl. .................................... 426/615; 426/578; 426/589; 426/650
[58] Field of Search ................. 426/578, 615, 650, 589

[56] References Cited

U.S. PATENT DOCUMENTS

| | | | |
|---|---|---|---|
| 1,036,338 | 8/1912 | Ressencourt et al. | 426/650 |
| 2,182,829 | 12/1939 | Thomas | 426/615 |
| 2,563,996 | 8/1951 | Edgar | 426/615 |
| 2,813,797 | 11/1957 | Toulmin | 426/615 |
| 2,899,319 | 8/1959 | Powers. | |
| 3,021,222 | 2/1962 | Kerr et al. | 426/615 |
| 3,058,831 | 10/1962 | Lorant. | |
| 3,958,028 | 5/1976 | Burg. | |
| 4,011,348 | 3/1977 | Farrier et al.. | |
| 4,271,202 | 6/1981 | Giel | 426/650 |
| 4,636,397 | 1/1987 | Brown et al. | 426/578 |

FOREIGN PATENT DOCUMENTS

| | | | |
|---|---|---|---|
| 589876 | 7/1947 | United Kingdom. | |
| 710766 | 6/1954 | United Kingdom. | |
| 1230105 | 4/1971 | United Kingdom | 426/615 |
| 799710 | 2/1981 | U.S.S.R.. | |

OTHER PUBLICATIONS

Furia, T. E.; *CRC Handbook of Food Additives*, second edit., vol. I (1972) pp. 515–521.
"Amaizo 400 Stabilizer" brochure—American-Maize--Products Co.

*Primary Examiner*—Wilbur Bascomb
*Attorney, Agent, or Firm*—Wood, Herron & Evans

[57] ABSTRACT

The flavor of food is enhanced by the addition of a puree of previously frozen sour cherries thickened with natural starch. The thickened puree improves the flavor of food without imparting a cherry taste thereto.

22 Claims, No Drawings

PRODUCT FOR AND METHOD OF ENHANCING THE FLAVOR OF FOOD

BACKGROUND OF THE INVENTION

Throughout recorded history, examples abound which demonstrate man's relationship with the food he consumes and his desire to improve its palatability. Man learned in ancient times to season meat, fish and vegetables with salt. He learned to preserve as well as improve the flavor of meat andfish by storing in a smokehouse. Peppercorns were once used as a form of money because of their rarity and desirability. Discovery and exploration of lands neverbefore known to exist were precipitated by man's desire to find a sea route to the spice-laden islands of the Far East.

In modern times, the improvement of food flavor has become a science. Chemists and flavorists analyze the components of foods, isolate those components which contribute to the desired food flavor, and then synthesize compounds which are identical or very similar to those desired flavor components. The synthetic compounds are then reincorporated into the food to boost the flavor and consequently improve its saleability.

Flavor improvement conducted in this manner produces foods having increased palatability, but the process is time-consuming and involves large expenditures of man-hours and money. Also, the synthesized flavor booster is often a laboratory-prepared product. It is not considered a "natural" product and is thus regarded as suspect by certain consumers.

BRIEF DESCRIPTION OF THE INVENTION

It has been found that a combination of a natural starch and pureed sour cherries produces a product which, when incorporated into certain foods, enhances the flavor thereof. Several varieties of sour cherry exist in nature. The most abundant variety of sour cherry is Montmorency, and accordingly, this variety is preferred in practicing the teachings of this invention. Sour cherries are first pitted, and then frozen and stored for a minimum of two months. The frozen pitted cherries are then partially thawed to permit grinding, which reduces the cherries to a fine, evenly ground puree. Alternatively, the cherries are pitted and pureed prior to freezing with subsequent thawing. The puree is then combined with a thickening starch to form a smooth mixture, and the combination is heated to promote thickening. Some water may be added during the heating step, but the addition is kept to a minimum. The thickened mixture is then packaged in the absence of air in a sealed container and stored for at least one month prior to use as an enhancer on foods.

It is not known why the thickened sour cherry puree has an enhancing effect on the taste of food. However, it is believed that the effect is peculiar to the sour cherry. The thickened sour cherry puree does not impart any characteristic "cherry" flavor to the enhanced food. Sour cherries do not contain volatile oils such as those found in strawberries, raspberries, apples, and other fruit. Consequently, sour cherries do not have a characteristic "cherry" odor. In addition, the process of freezing, thawing, grinding, cooking in the presence of starch, and storing removes any sour cherry taste from the thickened puree.

The thickened puree may be used to enhance or brighten and flavor of a variety of foods. The thickened puree improves the flavor of gravies, cheese or egg sauces, and dishes incorporating tomatoes. The thickened puree masks harsh notes in the food, so that one would not use the enhancer with a food where "bite" or harshness is desirable, such as with a horseradish-based sauce. The thickened puree enhancer generally works to strengthen the underlying flavor of foods, with the result that foods already having a strong underlying flavor such as cabbage dishes would be detrimentally enhanced by the use of the thickened puree.

DETAILED DESCRIPTION OF THE INVENTION

The method of enhancing the flavor of food is practiced by the process as described hereinbelow.

Approximately 44 pounds of Montmorency cherries are picked, cleaned and pitted. The pitting operation is generally performed by the use of a Dunkley or Elliott pitter. The pitted cherries, weighing approximately 40 pounds, are placed in an appropriate storage container which minimizes moisture loss, such as a clear pastic bag, and are then quick-frozen at approximately 0° F. The cherries are maintained in the frozen state, preferably in the presence of air for at least two months. After the storage period, the cherries are partially thawed and then ground to produce a fine, even-texture puree. It is preferred that the size of the cherry pieces be approximately 1/32 inch in diameter on average, and that individual pieces be no larger than about 1/16 inch in diameter. Cherry pieces having the above dimensions may be incorporated into other foods without causing a lumpy or otherwise undesirable appearance. The enhancing properties of the final cherry product will not be adversely affected if the size of the pieces is larger, but individual diameters should not exceed ⅛ inch. The cherries are only partially thawed so as to minimize free liquid during the grinding operation. Excess liquid during this step interferes with the production of a fine, even-texture puree.

After the cherries have been pureed, they are transferred to an open top container or kettle having heating means connected thereto. Approximately 24 ounces of maize starch, such as Amaizo 400 Stabilizer ® Starch from the American Maize-Products Company, is added to approximately one quart or about three pounds of the pureed cherries and uniformly distributed. Starch is preferably added in an amount which corresponds to about 0.4 to 0.65 ounces of starch per pound of frozen cherries. The starch-pureed cherry portion is then added to the remainder of the pureed cherries and mixed throughout. The starch is added to the cherries after pureeing has been completed, but before the cherries have thawed completely. Therefore, the product mixture is slightly below room temperature after the starch addition.

The pureed cherries and starch are then heated and held at approximately 190°–212° F. for about 15 minutes. To improve the stability of the thickened puree mixture, about one ounce of carboxymethylcellulose is optionally added to the mixture as soon as the desired cooking temperature is reached. The carboxymethylcellulose has no effect on the flavor-enhancing properties of the mixture. Because the cherry mixture is open to the air, water will be lost as vapor during the cooking step. However, over the short period of time that the mixture is being cooked, the water loss does not adversely affect the properties of the finished enhancer material.

After the cooking step is completed, the thickened cherry puree is bottled and sealed in a manner which substantially excludes air from the mixture, e.g., by vacuum packing in a glass container. The bottled product should be stored for at least one month, preferably away from direct light, prior to use as an enhancer.

The prepared food enhancer has excellent shelf-life properties. The enhancer has a reddish-brown color which is due largely to the pureed cherry skins. This color may alter the color of the food to be enhanced, and as a result, the thickened cherry puree is generally not used in white sauces.

The cherries which are used to prepare the puree are preferably frozen whole after cleaning and pitting. In an alternative embodiment, raw pitted cherries may be pureed prior to freezing. For optimum enhancement properties, all parts of the cherry must be collected after pureeing, including the juice. The pureed raw cherries must then be frozen at once to prevent degradation that occurs quickly after the cherry is pureed. A third alternative eliminates the cherry freezing step altogether. The raw pitted cherries are cooked prior to or after pureeing, and additional sweetener must be added to counteract a natural off-note. The unfrozen pureed cherries are then processed similarly to the cherries which had been frozen. One disadvantage to processing without freezing is that the color of the cherry puree rapidly loses its reddish tint and appears brown. Further, the thickened puree must be aged longer before use as an enhancer. Also, cherry enhancer produced from unfrozen cherries tends to vary in quality as a result of variations in the properties of the individual batches of starting cherries. Thus, two primary benefits of the freezing step are that it eliminates the need to add sugar or other sweetener to the pureed cherries and that it tends to minimize the variability in the individual batches of cherries so as to produce flavor enhancer of more uniform quality.

It has been found that the desired thickening of the puree occurs with corn starch or alternatively, tapioca starch. Pectins, which are used in the preparation of fruit jams and jellies, have been considered for use in the enhancer formulation, but both the enhancement and rheological properties of the pectin-puree mixture were undesirable.

The flavor enhancer is generally useful in amounts of about one tablespoon to one-half cup per serving of the prepared food. By way of example, the thickened puree can be used to enhance the flavor of strawberry shortcake by adding one-fourth cup to the strawberries. For soup and stews, one-half cup of thickened puree per quart provides enhanced flavor. The flavor of meat and ham loaves can be enhanced by adding one-fourth cup thickened puree per pound of meat. Cheese sauces can be improved by adding two tablespoons thickened puree per cup of sauce. The flavor of quiches, souffles, savouries and hors d'oeuvres can be enhanced by adding one-half cup thickened puree to four eggs and one cup milk. In each instance, the flavor enhancement is accomplished without imparting any additional cherry flavor to the food.

Having described this invention and its preferred parameters, variations may be achieved without departing from the spirit and scope hereof.

What is claimed is:

1. A method of preparing a food enhancer comprising:
   pitting sour cherries and freezing them;
   storing the frozen cherries for a minimum of at least two months; then
   thawing the frozen cherries sufficiently that they can be ground, and grinding them to a fine puree;
   adding a thickening starch to the puree, without the addition of sugar or other sweetener, to form a smooth mixture;
   heating the mixture to thicken it, without substantial addition of water thereto;
   packaging the thickened mixture in the absence of air; and
   storing it for at least one month before use.

2. The method of claim 1 further wherein the thickened mixture is added to a food in an amount sufficient to enhance the flavor of the food, but insufficient to impart a cherry taste to it.

3. The method of claim 1 wherein said starch is added in amount of about 0.4 to 0.65 ounces per pound of frozen cherries.

4. The method of claim 1 wherein said starch is a maize starch.

5. The method of claim 1 wherein said product is added to a prepared food in an amount of one tablespoon to one-half cup per serving of said prepared food, the amount added being insufficient to impart a cherry taste to said prepared food.

6. The method of claim 1 wherein the skins of the cherries are present in the puree.

7. The method of claim 1 wherein the product is packed under vacuum.

8. The method of claim 1 wherein said pitted sour cherries are frozen at approximately 0° F.

9. The method of claim 1 wherein said frozen cherries are stored in the presence of air.

10. The method of claim 1 wherein said mixture is heated to a temperature between about 190° F. and about 212° F.

11. The product of the method of claim 1.

12. A method of preparing a food enhancer comprising:
   pitting sour cherries;
   grinding the pitted cherries to form a fine puree;
   freezing the pureed cherries;
   storing the frozen pureed cherries for a minimum of two months; then
   thawing the frozen pureed cherries;
   adding a thickening starch to the puree, without the addition of sugar or other sweetener, to form a smooth mixture;
   heating the mixture to thicken it, without substantial addition of water thereto;
   packaging the thickened mixture in the absence of air; and
   storing it for at least one month before use.

13. The method of claim 12 further wherein the thickened mixture is added to a food in an amount sufficient to enhance the flavor of the food, but insufficient to impart a cherry taste to it.

14. The method of claim 12 wherein said starch is added in an amount of about 0.4 to 0.65 ounces per pound of frozen cherries.

15. The method of claim 12 wherein said starch is a maize starch.

16. The method of claim 12 wherein said product is added to a prepared food in an amount of one tablespoon to one-half cup per serving of said prepared food, the amount added being insufficient to impart a cherry taste to said prepared food.

17. The method of claim 12 wherein the skins of the cherries are present in the pureed cherries.

18. The method of claim 12 wherein the product is packed under vacuum.

19. The method of claim 12 wherein said pitted, pureed sour cherries are frozen at approximately 0° F.

20. The method of claim 12 wherein said frozen cherries are stored in the presence of air.

21. The method of claim 12 wherein said mixture is heated to a temperature between about 190° F. and about 212° F.

22. The product of the method of claim 12.

* * * * *